United States Patent
Monico

(12) 
(10) Patent No.: US 6,557,758 B1
(45) Date of Patent: May 6, 2003

(54) DIRECT TO PACKAGE PRINTING SYSTEM WITH RFID WRITE/READ CAPABILITY

(75) Inventor: Dominick L. Monico, Williamsville, NY (US)

(73) Assignee: Moore North America, Inc., Stamford, CT (US)

( * ) Notice: Subject to any disclaimer, the term of this patent is extended or adjusted under 35 U.S.C. 154(b) by 0 days.

(21) Appl. No.: 09/409,869

(22) Filed: Oct. 1, 1999

(51) Int. Cl.[7] ................................................. G06K 5/00
(52) U.S. Cl. ..................... 235/380; 235/375; 340/572.1
(58) Field of Search ................................. 235/492, 380, 235/435, 487, 384; 340/10.51, 10.1, 10.3, 10.4, 572.1–572.9

(56) References Cited

U.S. PATENT DOCUMENTS

| | | | |
|---|---|---|---|
| 3,750,167 A | | 7/1973 | Gehman et al. ............... 342/44 |
| 4,378,564 A | * | 3/1983 | Cross et al. ................... 347/54 |
| 5,038,283 A | * | 8/1991 | Caveney ........................ 705/28 |
| 5,151,684 A | * | 9/1992 | Johnsen .................... 340/568.1 |
| 5,218,343 A | | 6/1993 | Stobbe et al. ............. 340/573.4 |
| 5,251,555 A | * | 10/1993 | Speicher .................. 101/93.04 |
| 5,528,222 A | | 6/1996 | Moskowitz et al. ...... 340/572.7 |
| 5,557,096 A | * | 9/1996 | Watanabe et al. ............ 235/492 |
| H1606 H | * | 11/1996 | Gelnovatch et al. ......... 340/505 |
| 5,640,002 A | * | 6/1997 | Ruppert et al. ......... 235/462.46 |
| 5,685,651 A | * | 11/1997 | Hayman et al. ............... 400/88 |
| 5,768,217 A | | 6/1998 | Sonoda et al. ................. 368/10 |
| 5,776,278 A | | 7/1998 | Tuttle et al. ................. 156/213 |
| 5,929,780 A | * | 7/1999 | Pagnol et al. ............. 340/10.51 |
| 5,942,987 A | * | 8/1999 | Heinrich et al. .......... 340/10.42 |
| 6,398,109 B1 | * | 6/2002 | Ohki .......................... 235/384 |

FOREIGN PATENT DOCUMENTS

GB      2 289 602      11/1995

* cited by examiner

Primary Examiner—Michael G. Lee
Assistant Examiner—Jamara A Franklin
(74) Attorney, Agent, or Firm—Nixon & Vanderhye PC

(57) ABSTRACT

A passive RFID tag is provided in a product, and then the product is packaged. Rather than printing a high-quality label that must be optically scanned, and applying the label on the package, shipping and tracking data are encoded in the RFID tag. Then the only thing that needs to be applied to the package is human readable address information, which may be imaged directly on the package, such as by an ink jet printer. The final package need have no label at all, let alone one with shipping and tracking information.

20 Claims, 2 Drawing Sheets

DIRECT TO PACKAGE PRINTING SYSTEM WITH RFID WRITE/READ CAPABILITY

BACKGROUND AND SUMMARY OF THE INVENTION

With the advent of passive RFID (Ratio Frequency Identifier) tags (without a battery power source), the price point to use an RF tag has dropped significantly from the previous Active tag price ($0.50–$1.00 from $3.00 to $10.00). As this new passive technology progresses, the price point for a passive RF tag will likely approach the $0.10 mark. As the price drops, many commercially-available retail products will eventually be manufactured with a passive tag embedded (with read/write capability) into the produce or packaging as a normal part of the manufacturing process allowing the massive proliferation of RFID system use.

One of the first industry segments pioneering the use of passive RFID tags is Express Transport with such companies such as DHL, UPS, FedEx, etc. Today, these companies require a high-quality, bar-coded package label to be created and affixed to the package that shows information such as shipper identification, destination, shipment number, etc. These bar-coded labels are then scanned at various times to sort and track the package along its delivery cycle. Usually these labels are produced by thermal label printing systems located at their customer sites or at their shipping depots. Within these shipping companies, RFID technology is seen as a replacement technology to optically scan bar codes. Today, these companies are testing passive RFID technology to replace optically-scanned bar codes, including passive RFID technology which involves having a pressure-sensitive label generated by a thermal printer that at the same time of printing the package label, encodes the RF chip (embedded into the label).

Once the RF chips move to lower cost, they will eventually be incorporated into the retail products themselves. As an example, when a computer is manufactured, the manufacturer will embed an RF chip into the frame which could contain production dates, etc., for warranty information. This chip could then be later encoded with relevant shipment information (for sorting and tracking purposes) by the shipment company (e.g., UPS, DHL, etc.) using a radio signal transmitted to the package as the label is visually imaged with the delivery address. Since the bar code, which is normally on the package label, will not be needed for scanning or sorting the package, the only thing needed on the package label is a readable address. Thus, instead of the current package labeling system (thermal label printer with RF transmitter), a lower-cost system could be used. This system could be a small ink jet printing system equipped with a Radio Frequency transmitter. This ink jet system could then print the delivery address directly on the package, eliminating the need for applying the thermal label. Today, the label is required to provide a high-quality surface for the bar code or to act as a carrier for the RF chip.

The ink jet system will not be required to be high quality, only producing a readable address, such as the conventional non-contact ink jet systems that are used today to print production dates on products such as canned goods, bottles, etc.

According to one aspect of the present invention, a method of handling a product is provided, comprising: (a) Installing a conventional RFID tag in the product. (b) Providing the product with RFID tag in a package. (c) Imaging human-readable address information directly on the package. And, (d) encoding the RFID tag with at least one of shipping and tracking data.

Typically, (c) and (d) are practiced simultaneously, e.g., using a combination printer and RF transmitter. Typically (c) may be practiced using an ink jet printer which may be low resolution, or other low-resolution printer (that is, having a resolution of less than 200 dpi) since the address information need not be machine readable. Preferably, (a) and (d) are practiced so that no label with shipping or tracking information is provided on the package, and in fact the package may be substantially devoid of a label at all. Typically, (a) is practiced using a passive RFID tag, although an active tag (one with a battery) may be used.

The invention also relates to a package produced by the methods as described above. According to another aspect of the present invention, there is provided a package product comprising a product having a conventional RFID tag (e.g., a passive RFID tag) therein encoded with at least one of shipping and tracking data. A package packaging the product and having an external surface. And, human readable address or tracking indicia visible from the external surface of the package.

In the package according to the invention, the human-readable indicia may be imaged substantially directly on the package external surface. Alternatively, it could be imaged in an insert, which ultimately is readable from the exterior of the package, such as a simple piece of paper insert which is visible when the product is wrapped in plastic or a window envelope, or could even be provided on a low-quality label, although it is desirable to entirely avoid the cost of the label according to the invention. The human readable indicia may be low resolution (e.g., below 200 dpi) address indicia, or other low-resolution tracking or shipping information. Preferably, the package is substantially devoid of a label with RFID technology, or of a label with shipping or tracking indicia.

According to yet another aspect of the present invention, there is provided a method of packaging a product having an RFID tag (e.g., a passive RFID tag) therein. The method comprises (a) providing the product with RFID tag in a package. (b) Imaging a human readable address so that it is visible from the exterior of the package. And (c) encoding the RFID tag with at least one of shipping and tracking data. The details of the method are as described above, e.g., for example, (b) and (c) may be practiced substantially simultaneously.

It is the primary object of the present invention to provide a simple, yet effective method, and package, which allows ready and accurate shipping and tracking of a product in an inexpensive manner. This and other objects of the invention will become clear from an inspection of the detailed description of the invention and from the appended claims.

DETAILED DESCRIPTION OF THE DRAWINGS

Figure 1:
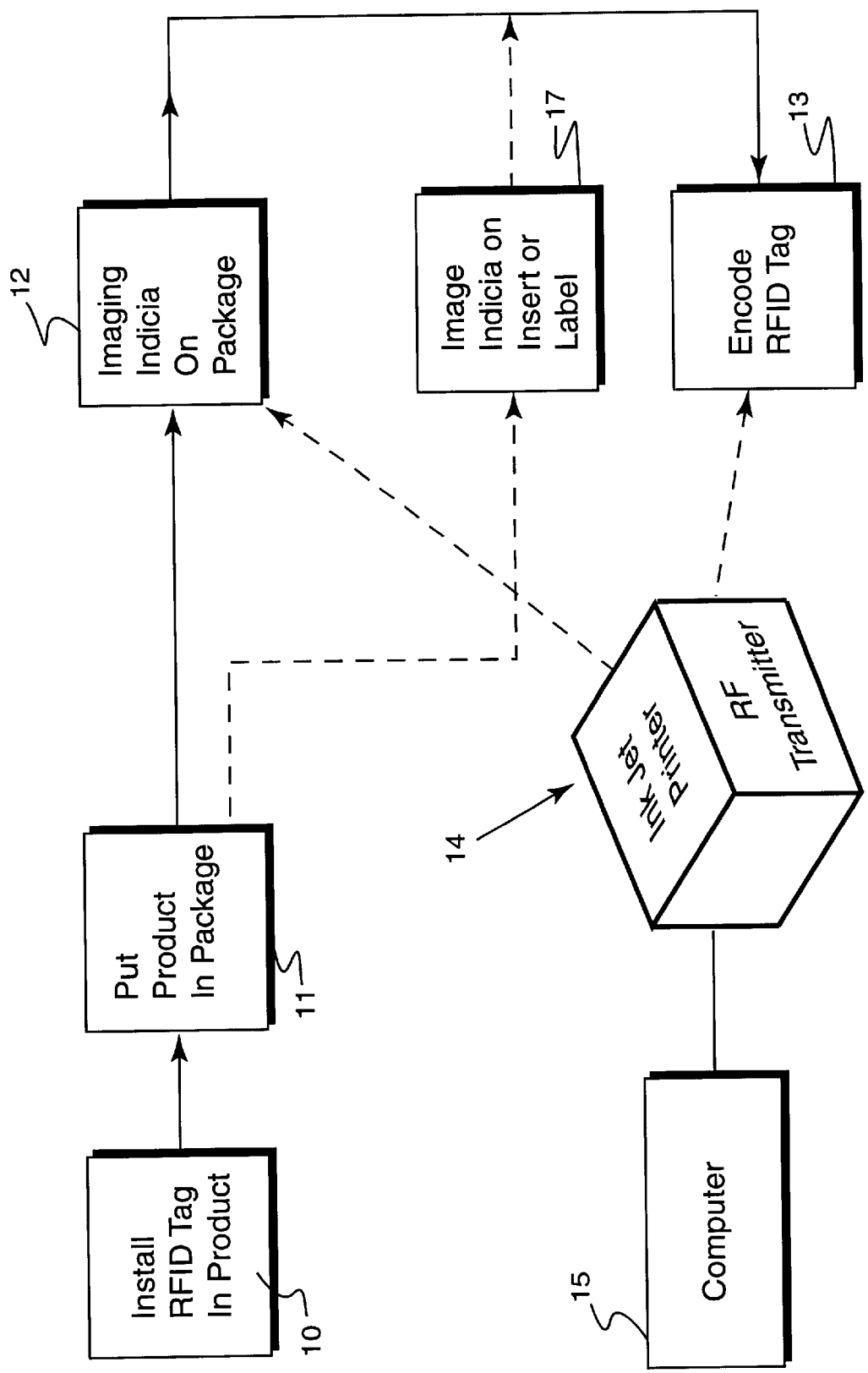
FIG. 1 is a box diagram illustrating an exemplary method steps that may be utilized for practicing the present invention.

An exemplary method facilitating simple, accurate and inexpensive shipping and tracking of a product is illustrated in box form in FIG. 1. In this disclosure, the term "product"

can cover anything that is a normal, otherwise functional or decorative object that is desired to be shipped. Nonlimiting examples include computer equipment, articles of furniture, appliances, pieces of art, manufactured goods, raw materials including precious metals, etc.

According to the method as illustrated schematically in FIG. 1, a conventional RFID tag—such as a passive RFID tag—is installed in a product, as indicated by box 10. U.S. Pat. Nos. 5,776,278 and 5,218,343 are representative of conventional RFID tags (although they are preferably active tags, which contain a battery) that are incorporated in products (the disclosures of these patents are hereby incorporated by reference herein). The RFID tag has read/write capability. However, the RFID tag may be associated with the product in any manner. For example, it could be installed in the product casing, such as in the case of a laptop computer or other computer equipment, or an appliance. Alternatively, it could be mixed in with a raw material, it could be applied in the form of a label on a product, it could be applied to an accessory package of a product, etc. The exact manner in which the RFID tag is installed in the product is not critical, but can be any process which is suitable for that particular product.

The next method procedure according to the present invention illustrated schematically by box 11 in FIG. 1 is to put the product into a package. The term "package" means a carton, shrink-wrap plastic, envelope, metal shipping container, crate or any other suitable conventional structure which can be used for packaging a product so as to facilitate handling, shipping and/or tracking thereof.

After procedure 11, as indicated by boxes 12 and 13 in FIG. 1, indicia is imaged on the package, and the RFID tag is encoded with at least one of shipping and tracking data. Typically, procedures 12, 13 are practiced substantially simultaneously, such as by utilizing an ink jet, or similar, printer with a built-in RF transmitter, both controlled by a computer. The combination printer/RF transmitter is shown schematically at 14 in FIG. 1 while a suitable computer control is shown schematically at 15 therein. Typically, the RFID tag will have other information associated with the product, for example, in the case of a computer production date, serial number, coded information, or the like is provided in an RFID tag. The RF transmitter 14 adds to that data shipping and/or tracking data, and a conventional RF sensor/reader (not shown) may be associated with the computer 15 too so as to coordinate the shipping and/or tracking data with the other data of the RFID chip.

While an active RFID tag may be installed in the product, preferably a passive RFID tag is utilized instead.

While the exact imaging processor equipment is not significant in the practice of the invention, it is preferred that a relatively low resolution technology be utilized, for example, an ink jet printer having a resolution of about 200 dpi or less, such as the type conventionally used to print production dates on canned goods, bottles, or the like. In this way, the configurations of the packages that are being utilized in the practice of the invention may vary widely without having to change the printing system or procedure.

While it is preferred for cost-saving purposes that human-readable indicia be imaged substantially directly on the package, as indicated by box 12 in FIG. 1, in some circumstances, or where cost is not a significant motivating factor, the human-readable indicia (which may be address, shipping, tracking and/or like indicia) may be imaged on an insert which is provided in the package (and ultimately visible from the exterior of the package, e.g., as through shrink-wrap plastic, a window in the package, or the like), or such indicia may be imaged on a low-quality label which is then applied to the package. These alternative procedures are illustrated schematically at 17 in FIG. 1.

The invention also relates to a product produced by a method as set forth above, and a packaged product per se.

Figure 2:
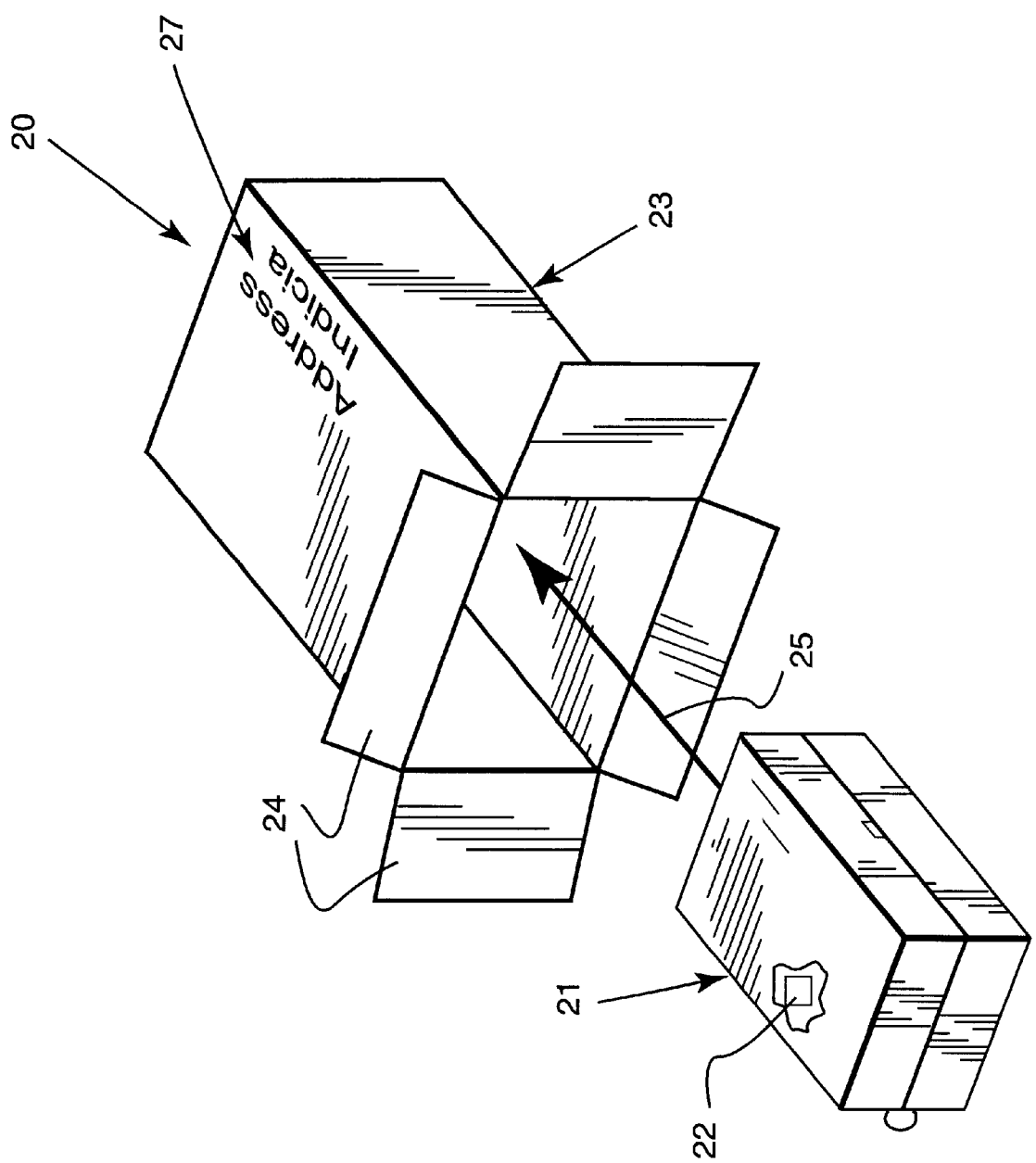
FIG. 2 is an exploded view of an exemplary package according to the present invention.

An exemplary packaged product according to the present invention is shown schematically at 20 in FIG. 2. In this case, the product, shown schematically at 21, is a laptop computer. However, as earlier indicated, the product may comprise virtually anything that is desirably shipped and/or tracked, including appliances, manufactured goods, bulk materials, furniture, works of art, etc. The product 21 has an RFID tag 22 installed therein. In the particular embodiment illustrated in FIG. 2, the RFID tag 22 (which may be a passive tag) is actually embedded in the product 21. Of course, depending upon the product or the technique desired, the RFID tag 22 may be applied with a label, may be loosely placed in the product, may be mixed with fluent product, or may be attached by any other suitable conventional manner to the product.

The product 21 with RFID tag 22 is provided within a package, shown schematically at 23 in FIG. 2. FIG. 2 shows the package 23 in the form of a conventional cardboard or paperboard carton having a plurality of flaps which are closed and sealed (e.g., with tape, staples or the like) to completely close the packaged products. Simply for clarity of illustration, the panels or flaps 24 on one end of the carton 23 are shown open and the product 21 is shown by arrow 25 as being inserted into the open package 23. However, it is not significant according to the invention exactly how the product 21 is packaged, or what the package comprises. The package 23 may be a crate, envelope, drum, or any other conventional structure which facilitates handling, shipping and/or tracking.

FIG. 2 also illustrates the human readable indicia, in the form of address indicia 27, in this embodiment, which has been imaged (e.g., by a conventional low-resolution ink-jet printer 14) directly on the package 23. The RFID tag 22 has shipping and/or tracking data encoded therein which has a relationship with the human readable indicia 27.

In use, the packaged product 20 is shipped by any suitable source, and at various locations (including the origin, destination and any transfer points). A conventional RF reader/receiver (not shown) is moved into appropriate proximity with the packaged product 20, reading the shipping and/or tracking data encoded in the RFID tag 22, and providing information to the human handlers based thereon. A human handler can check at least part of the shipping and/or tracking data by viewing the human-readable indicia 27 imaged on the carton 23.

It will thus be seen that according to the present invention, a highly-advantageous method and package are provided which utilize RF technology to facilitate shipping and/or tracking of a packaged product, and providing for production thereof in a simple, inexpensive and effective manner. While the invention has herein been shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims, so as to encompass all equivalent methods and devices.

What is claimed is:

1. A method of handling a product, comprising:
   (a) installing an RFID tag within the product;
   (b) providing the product with RFID tag in a package;
   (c) imaging human-readable address information directly on the package; and
   (d) encoding the RFID tag with at least one of shipping and tracking data,
       wherein said imaging step and said encoding step are practiced substantially simultaneously.

2. A method as recited in claim 1 wherein (c) is practiced using an ink jet printer.

3. A method as recited in claim 2 wherein (a)–(d) are practiced so that no label with shipping or tracking information is provided on the package.

4. A method as recited in claim 1 wherein (c) is practiced using low resolution printing.

5. A method as recited in claim 4 wherein (c) is practiced using an ink jet printer.

6. A method as recited in claim 1 wherein (a)–(d) are practiced so that no label with shipping or tracking information is provided on the package.

7. A method as recited in claim 6 wherein (a) is practiced using a passive RFID tag.

8. A packaged product produced by the method of claim 6.

9. A method as recited in claim 1 wherein (c) is practiced using an ink jet printer.

10. A method as recited in claim 1 wherein (c) and (d) are practiced using a combination printer and RF transmitter.

11. A packaged product produced by the method of claim 1.

12. A packaged product, comprising:
    a product having an RFID tag embedded there within and encoded with at least one of shipping and tracking data;
    a package packaging said product and having an external surface; and
    human readable address or tracking indicia visible from said external surface.

13. A package as recited in claim 12 wherein said human readable indicia is imaged substantially directly on said package external surface.

14. A package as recited in claim 13 wherein said human readable indicia is low resolution address indicia.

15. A package as recited in claim 13 wherein said package is substantially devoid of a label with RFID technology and at least one of shipping and tracking data.

16. A package as recited in claim 15 wherein said RFID tag has both tracking and shipping information, and wherein said package is substantially devoid of a label with shipping or tracking indicia.

17. A package as recited in claim 12 wherein said RFID tag has both tracking and shipping information, and wherein said package is substantially devoid of a label with shipping or tracking indicia.

18. A package as recited in claim 12 wherein said RFID tag is a passive RFID tag.

19. A method of packing a product having an RFID tag therein, comprising:
    (a) providing the product with an RFID tag there within, in a package;
    (b) imaging a human readable address so that it is visible from the exterior of the package; and
    (c) encoding the RFID tag with at least one of shipping and tracking data,
        wherein said imaging step and said encoding step are practiced substantially simultaneously.

20. A method as recited in claim 19 wherein the RFID tag is a passive RFID tag.

* * * * *